(12) United States Patent
Jeong et al.

(10) Patent No.: US 8,339,981 B2
(45) Date of Patent: Dec. 25, 2012

(54) APPARATUS AND METHOD FOR MEASURING HOME CELL/PRIVATE NETWORK CELL IN MOBILE COMMUNICATION SYSTEM

(75) Inventors: Kyeong-In Jeong, Hwaseong-si (KR); Soeng-Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 448 days.

(21) Appl. No.: 12/672,639

(22) PCT Filed: Aug. 7, 2008

(86) PCT No.: PCT/KR2008/004597
§ 371 (c)(1),
(2), (4) Date: Feb. 8, 2010

(87) PCT Pub. No.: WO2009/020361
PCT Pub. Date: Feb. 12, 2009

(65) Prior Publication Data
US 2011/0194424 A1    Aug. 11, 2011

(30) Foreign Application Priority Data
Aug. 7, 2007    (KR) .................. 10-2007-0079268

(51) Int. Cl.
*H04W 24/08*    (2009.01)
(52) U.S. Cl. ..... 370/252; 370/312; 370/328; 455/67.11; 455/436
(58) Field of Classification Search .......... 370/252, 370/312, 328–335, 338; 455/67, 423–561
See application file for complete search history.

(56) References Cited

U.S. PATENT DOCUMENTS

| | | | | |
|---|---|---|---|---|
| 5,241,685 A | * | 8/1993 | Bodin et al. | 455/453 |
| 5,301,356 A | * | 4/1994 | Bodin et al. | 455/436 |
| 5,509,051 A | * | 4/1996 | Barnett et al. | 455/443 |
| 5,640,414 A | * | 6/1997 | Blakeney et al. | 375/130 |
| 5,640,677 A | * | 6/1997 | Karlsson | 455/434 |
| 5,649,000 A | * | 7/1997 | Lee et al. | 455/436 |
| 5,710,981 A | * | 1/1998 | Kim et al. | 455/69 |
| 5,754,945 A | * | 5/1998 | Lin et al. | 455/436 |
| 5,859,838 A | * | 1/1999 | Soliman | 370/249 |
| 5,930,721 A | * | 7/1999 | Fried et al. | 455/466 |
| 6,088,588 A | * | 7/2000 | Osborne | 455/425 |
| 6,131,029 A | | 10/2000 | Roberts | |
| 6,151,508 A | * | 11/2000 | Kim et al. | 455/522 |
| 6,178,326 B1 | * | 1/2001 | Kalliokulju | 455/437 |

(Continued)

FOREIGN PATENT DOCUMENTS
EP    1841267 A2 * 10/2007

*Primary Examiner* — Michael Thier
*Assistant Examiner* — Vincelas Louis
(74) *Attorney, Agent, or Firm* — The Farrell Law Firm, P.C.

(57) ABSTRACT

Disclosed is a method of measurement on a home cell/private network cell, by a user equipment (UE), in a mobile communication system, the method including the steps of: transmitting a request message requesting the measurement to a network node, the request message including an indicator instructing at least one of register, join, and use of the home cell/private network cell; receiving a response message corresponding to the request message from the network node, the response message including context information for measurement control of at least one home cell/private network cell accessible by the UE; and selectively executing measurement on the accessible home cell/private network cell by using the context information.

16 Claims, 11 Drawing Sheets

U.S. PATENT DOCUMENTS

| | | | |
|---|---|---|---|
| 6,285,884 B1* | 9/2001 | Vaara | 455/441 |
| 6,415,155 B1* | 7/2002 | Koshima et al. | 455/456.1 |
| 6,445,917 B1* | 9/2002 | Bark et al. | 455/423 |
| 6,539,237 B1* | 3/2003 | Sayers et al. | 455/555 |
| 6,542,742 B2 | 4/2003 | Schramm et al. | |
| 6,567,389 B1* | 5/2003 | Honkasalo et al. | 370/342 |
| 6,584,325 B1 | 6/2003 | Shakhgildian | |
| 6,600,933 B1* | 7/2003 | Hiramatsu et al. | 455/561 |
| 6,618,591 B1* | 9/2003 | Kalliokulju et al. | 455/452.2 |
| 6,775,542 B1* | 8/2004 | Vilander et al. | 455/423 |
| 6,785,536 B1* | 8/2004 | Lee et al. | 455/408 |
| 6,801,772 B1* | 10/2004 | Townend et al. | 455/436 |
| 6,975,604 B1* | 12/2005 | Ishida et al. | 370/331 |
| 7,039,415 B2* | 5/2006 | Chen | 455/450 |
| 7,079,859 B2* | 7/2006 | Nobukiyo et al. | 455/522 |
| 7,136,638 B2* | 11/2006 | Wacker et al. | 455/424 |
| 7,184,760 B2* | 2/2007 | Funnell et al. | 455/423 |
| 7,233,805 B2* | 6/2007 | Choi | 455/522 |
| 7,346,349 B2* | 3/2008 | Numminen et al. | 455/434 |
| 7,346,352 B2* | 3/2008 | Colban et al. | 455/442 |
| 7,415,273 B2* | 8/2008 | Khawand | 455/434 |
| 7,499,700 B2* | 3/2009 | Dillon et al. | 455/423 |
| 7,567,810 B1* | 7/2009 | Overton | 455/456.3 |
| 7,580,362 B2* | 8/2009 | Timus | 370/252 |
| 7,583,969 B2* | 9/2009 | Mella et al. | 455/450 |
| 7,656,803 B2* | 2/2010 | Shin | 370/236 |
| 7,710,930 B2* | 5/2010 | Kwak | 370/338 |
| 7,715,850 B2* | 5/2010 | Lin | 455/456.1 |
| 7,738,907 B2* | 6/2010 | Xiao et al. | 455/522 |
| 7,801,047 B2* | 9/2010 | Yi et al. | 370/235 |
| 7,813,311 B2* | 10/2010 | Dick et al. | 370/324 |
| 7,823,155 B2* | 10/2010 | Misra et al. | 718/104 |
| RE41,930 E* | 11/2010 | Salonaho | 370/331 |
| 7,885,644 B2* | 2/2011 | Gallagher et al. | 455/414.2 |
| 7,907,952 B2* | 3/2011 | Lee et al. | 455/452.2 |
| 7,911,969 B2* | 3/2011 | Fischer | 370/252 |
| 7,917,137 B2* | 3/2011 | Suronen et al. | 455/432.1 |
| 8,036,656 B2* | 10/2011 | Jeong et al. | 455/434 |
| 8,073,464 B2* | 12/2011 | Lin | 455/456.1 |
| 8,099,055 B2* | 1/2012 | Bonneville et al. | 455/67.11 |
| 8,112,093 B2* | 2/2012 | Nakamata et al. | 455/452.2 |
| 8,135,407 B2* | 3/2012 | Fallgren et al. | 455/436 |
| 8,145,135 B2* | 3/2012 | Dalsgaard et al. | 455/67.11 |
| 8,149,746 B2* | 4/2012 | Demirhan et al. | 370/311 |
| 8,189,493 B2* | 5/2012 | Lee et al. | 370/252 |
| 8,224,329 B2* | 7/2012 | Van Lieshout et al. | 455/436 |
| 2001/0005676 A1* | 6/2001 | Masuda et al. | 455/433 |
| 2001/0029181 A1* | 10/2001 | Verkama | 455/426 |
| 2001/0031626 A1* | 10/2001 | Lindskog et al. | 455/67.3 |
| 2001/0046855 A1* | 11/2001 | Kil | 455/421 |
| 2002/0114280 A1* | 8/2002 | Yi et al. | 370/235 |
| 2003/0040323 A1* | 2/2003 | Pihl et al. | 455/456 |
| 2003/0109265 A1* | 6/2003 | Yamamoto et al. | 455/456 |
| 2004/0048624 A1* | 3/2004 | Ko et al. | 455/457 |
| 2004/0087340 A1* | 5/2004 | Cao et al. | 455/560 |
| 2004/0097237 A1* | 5/2004 | Aoyama | 455/445 |
| 2004/0102194 A1* | 5/2004 | Naghian et al. | 455/436 |
| 2004/0120265 A1* | 6/2004 | Numminen et al. | 370/252 |
| 2005/0014485 A1* | 1/2005 | Kokkonen et al. | 455/411 |
| 2005/0042987 A1* | 2/2005 | Lee et al. | 455/67.11 |
| 2005/0075112 A1* | 4/2005 | Ball et al. | 455/456.1 |
| 2005/0185612 A1* | 8/2005 | He | 370/329 |
| 2005/0227701 A1* | 10/2005 | Khawand | 455/453 |
| 2006/0089142 A1* | 4/2006 | Vuorinen et al. | 455/436 |
| 2006/0121935 A1* | 6/2006 | Dalsgaard et al. | 455/552.1 |
| 2006/0276188 A1* | 12/2006 | Pekonen et al. | 455/423 |
| 2006/0276226 A1* | 12/2006 | Jiang | 455/558 |
| 2006/0281463 A1* | 12/2006 | Yang | 455/442 |
| 2006/0291427 A1* | 12/2006 | Park | 370/332 |
| 2007/0064650 A1* | 3/2007 | Lohtia et al. | 370/331 |
| 2007/0099561 A1* | 5/2007 | Voss | 455/12.1 |
| 2007/0249352 A1* | 10/2007 | Song et al. | 455/436 |
| 2008/0090571 A1* | 4/2008 | Kwong | 455/436 |
| 2008/0096563 A1* | 4/2008 | Fischer et al. | 455/436 |
| 2008/0244148 A1* | 10/2008 | Nix et al. | 710/313 |
| 2008/0273482 A1* | 11/2008 | Lee et al. | 370/312 |
| 2008/0293433 A1* | 11/2008 | Wallis | 455/456.1 |
| 2008/0318576 A1* | 12/2008 | So et al. | 455/436 |
| 2009/0201858 A1* | 8/2009 | Riddington et al. | 370/328 |
| 2009/0257378 A1* | 10/2009 | Cuny et al. | 370/328 |
| 2009/0280771 A1* | 11/2009 | Bolin | 455/404.2 |
| 2010/0298017 A1* | 11/2010 | Dalsgaard et al. | 455/507 |
| 2010/0323631 A1* | 12/2010 | Martin et al. | 455/67.11 |
| 2011/0065393 A1* | 3/2011 | Pekonen et al. | 455/67.11 |
| 2011/0317574 A1* | 12/2011 | Richardson | 370/252 |
| 2012/0020293 A1* | 1/2012 | Nix et al. | 370/328 |

\* cited by examiner

UE should continuously perform inter-F/intra-F measurement
to detect accessible home cell/private network

APPARATUS AND METHOD FOR MEASURING HOME CELL/PRIVATE NETWORK CELL IN MOBILE COMMUNICATION SYSTEM

BACKGROUND OF THE INVENTION

1. Field of the Invention

The present invention relates to a mobile communication system, and more particularly to an apparatus and a method for measuring a home cell/private network cell.

2. Description of the Related Art

A Universal Mobile Telecommunication Service (UMTS) system is a $3^{rd}$ generation (3 G) asynchronous mobile communication system, which uses wideband Code Division Multiple Access (CDMA) and is based on Global System for Mobile Communications (GSM) and General Packet Radio Services (GPRS), which are European mobile communication systems.

In the mobile communication system, public/macro cells refer to generally generated cells. Home cells/private network cells refer to cells where only particular users can access, for example, cells specialized and made for home or a private network. Also, an accessible home cell/private network cell refers to an accessible cell among cells only particular users can access.

In a mobile communication system, a User Equipment (UE) continuously executes measurement on random home cells/private network cells in order to detect a UE accessible home cell/private network cell. Herein, in executing the measurement, when a home cell/private network cell is arranged in a different frequency band from a frequency band where a public/macro cell is arranged, the UE must execute inter-frequency measurement in order to detect the home cell/private network cell, and when the home cell/private network cell is arranged in the same frequency band as the frequency band where the public/macro cell is arranged, the UE must execute intra-frequency measurement in order to detect the home cell/private network cell.

Accordingly, as a conventional UE continuously executes measurement on random home cells/private network cells in order to detect an accessible home cell/private network cell, power consumption of the UE increases. Therefore, it is required to develop a method which allows a UE to execute measurement on only an accessible home cell/private network cell in order to detect its accessible home cell/private network cell and thus can reduce power consumption of the UE,

SUMMARY OF THE INVENTION

Accordingly, the present invention has been made to solve the above-mentioned problems occurring in the prior art, and the present invention provides a method and an apparatus for measuring a home cell/private network cell.

It is one aspect of the present invention to provide a method of measurement on a home cell/private network cell, by a user equipment (UE), in a mobile communication system, the method including the steps of: transmitting a request message requesting the measurement to a network node, the request message including an indicator instructing at least one of register, join, and use of the home cell/private network cell; receiving a response message corresponding to the request message from the network node, the response message including context information for measurement control of at least one home cell/private network cell accessible by the UE; and selectively executing measurement on the accessible home cell/private network cell by using the context information.

It is another aspect of the present invention to provide a method of measurement on a home cell/private network cell, by a network node, in a mobile communication system, the method including the steps of: receiving a request message requesting the measurement from a UE, the request message including an indicator instructing at least one of register, join, and use of the home cell/private network cell; obtaining context information for measurement control of at least one home cell/private network cell accessible by the UE from a higher node in accordance with the request message; and transmitting a response message including the context information to the UE.

Furthermore, it is another aspect of the present invention to provide UE executing measurement on a home cell/private network cell includes: a transceiver for transmitting a request message requesting the measurement to a network node, the request message including an indicator instructing at least one of register, join, and use of the home cell/private network cell, and receiving a response message in accordance with the request message, the response message including context information for measurement control of at least one home cell/private network cell accessible by the UE; and a controlling unit for generating the request message and selectively executing measurement on the accessible home cell/private network cell by using the context information It is a further aspect of the present invention is to provide a network node executing measurement on a home cell/private network cell includes: a controlling unit for: obtaining context information on at least one home cell/private network cell accessible by a UE from a higher node, in accordance with a request message from the UE, the request message requesting the measurement and including an indicator instructing at least one of register, join, and use of the home cell/private network cell; and generating a response message including context information for measurement on the accessible home cell/private network cell; and a transceiver for receiving the request message and transmitting the generated response message It is a still further aspect of the present invention is to provide a method of measurement on a home cell/private network cell, by a UE, in a mobile communication system, the method including the steps of: transmitting a request message requesting the measurement to a network node, the request message including an indicator instructing at least one of register, join, and use of the home cell/private network cell; receiving a control message instructing measurement on at least one home cell/private network cell accessible by the UE from the network node that has received context information for measurement control of the accessible home cell/private network cell from a higher node; and executing measurement on the accessible home cell/private network cell in accordance with the control message It is a yet further aspect of the present invention is to provide a method of measurement on a home cell/private network cell, by a network node, in a mobile communication system, the method including the steps of: receiving a request message requesting the measurement from a UE, the request message including an indicator instructing at least one of register, join, and use of the home cell/private network cell; obtaining context information for measurement control of at least one home cell/private network cell accessible by the UE, from a higher node; and transmitting a control message instructing measurement on the accessible home cell/private network cell to the UE when a public/macro cell is a serving cell of the UE or neighboring cells of the serving cell based on information of the public/macro cell locally overlapping with the accessible home cell/private network cell, the information of the public/macro cell being included in the context information; and receiving a measurement report message including a execution result of the instructed measurement from the UE.

It is a still yet further aspect of the present invention is to provide a UE executing measurement on a home cell/private network cell includes: a transceiver for transmitting a request message requesting the measurement to a network node, the request message including an indicator instructing at least one of register, join, and use of the home cell/private network cell, and receiving a control message instructing measurement on at least one home cell/private network cell accessible by the UE from the network node that has received context information for measurement control of the accessible home cell/private network cell from a higher node; and a controlling unit for generating a first message and executing measurement on the accessible home cell/private network cell in accordance with the control message.

It is a still yet another aspect of the present invention is to provide a network node executing measurement on a home cell/private network cell, the network node including: a controlling unit for obtaining context information for measurement control on at least one home cell/private network cell accessible by a UE from a higher node, in accordance with a request message from the UE, the request message requesting the measurement and including an indicator instructing at least one of register, join, and use of the home cell/private network cell; and generating a control message instructing measurement on the accessible home cell/private network cell when a public/macro cell is a serving cell of the UE or neighboring cells of the serving cell based on information of the public/macro cell locally overlapping with the accessible home cell/private network cell, the information of the public/macro cell being included in the context information; and a transceiver for receiving the request message requesting the measurement and transmitting and receiving the generated control message.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein is omitted to avoid making the subject matter of the present invention unclear.

Figure 1:
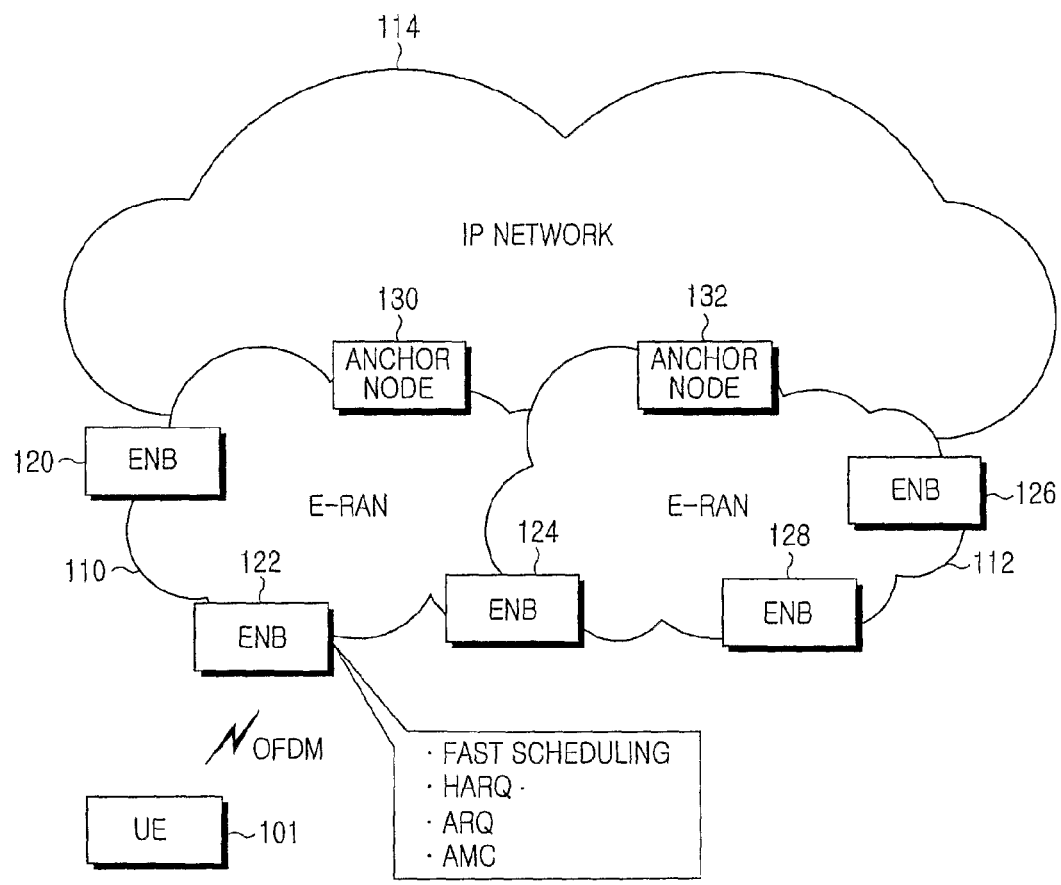
FIG. 1 illustrates an example of configuration of a mobile communication system to which the present invention is applicable.

FIG. 1 illustrates an example of configuration of a mobile communication system to which the present invention is applicable.

Referring to FIG. 1, Evolved UMTS Radio Access Networks (E-UTRANs or E-RANs) 110 and 112 have a simplified 2 node structure, which includes evolved Node Bs (eNBs or ENBs) 120 to 128 and anchor nodes 130 and 132. A User Equipment (UE) 101 is connected to an Internet Protocol (IP) network 114 through the E-RANs 110 and 112.

The eNBs 120 to 128 correspond to legacy Node Bs of a UMTS system and are connected to the UE 101 through a wireless channel. Differently from the legacy Node Bs, the eNBs 120 to 128 perform more complicated functions.

In the mobile communication system to which the present invention is applicable, all user traffic including the real-time service, such as Voice over IP (VoIP) using the Internet protocol, are provided through a shared channel. Therefore, the system requires an apparatus for collecting status information of UEs and executing scheduling by using the collected information. The eNBs 120 to 128 take charge of the scheduling. Usually, one eNB controls a plurality of cells. Further, the eNB executes Adaptive Modulation and Coding (AMC), which determines a modulation scheme and a channel coding rate in accordance with the channel status of a UE, and between the eNBs 120 to 128 and the UE 101, Hybrid Automatic Repeat Request (HARQ) is performed. Because it is impossible by only the HARQ to satisfy requirements for various Qualities of Service (QoSs), an outer Automatic Repeat Request (ARQ) in a higher layer may be performed between the UE 101 and the eNBs 120 to 128.

The HARQ process refers to a process of soft-combining previously-received data with retransmitted data without discarding the previously-received data, thereby improving the ratio of success in the reception. The HARQ process is used in order to improve the transmission efficiency in the high speed packet communication, such as the High Speed Downlink Packet Access (HSDPA) and the Enhanced Dedicated Channel (EDCH). In order to implement a maximum transmission speed of 100 Mbps, Long Term Evolution (LTE) is expected to use Orthogonal Frequency Division Multiplexing (OFDM) in 20 MHz bandwidth as wireless connection technology.

Figure 2:
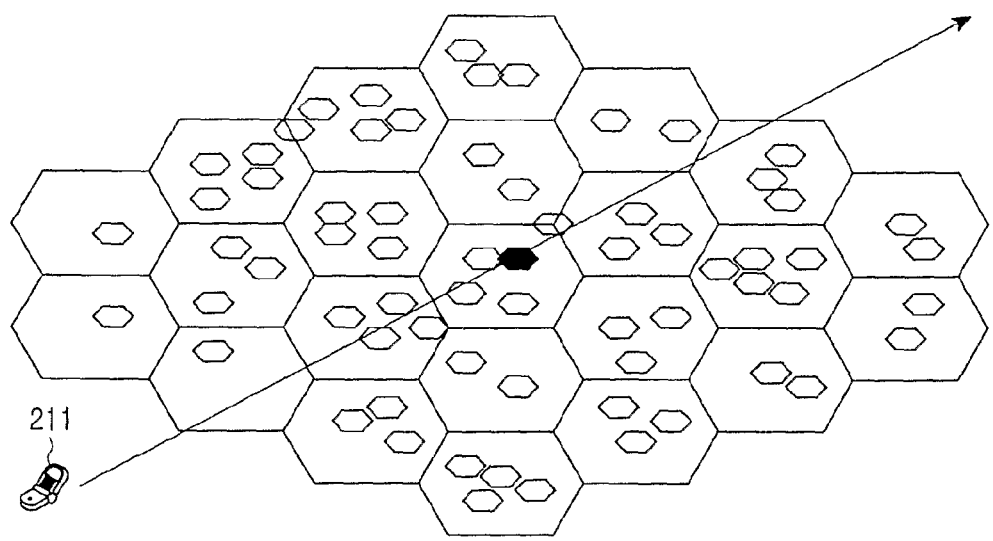
FIG. 2 illustrates an example of arrangement of home cells/private network cells in a mobile communication system to which the present invention is applicable.
Figure 2:
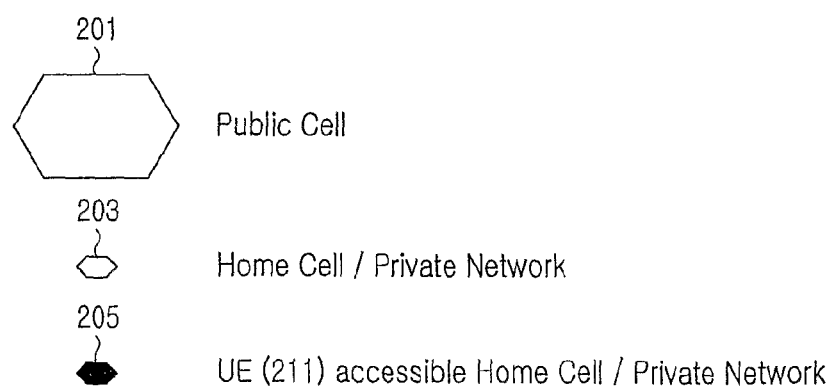

FIG. 2 illustrates an example of arrangement of home cells/private network cells in a mobile communication system to which the present invention is applicable.

Referring to FIG. 2, a reference number 201 indicates a public/macro cell, a reference number 203 indicates a home cell/private network cell, and a reference number 205 indicates a UE 211 accessible home cell/private network cell. Also, movement route of the UE 211 is represented by an arrow. As shown in FIG. 2, the UE 211 executes measurement on public/macro, cells 201 and home cells/private network cells 203 by moving via cells, and thus detects an accessible home cells/private network cell 205. In the mobile communication system according to an embodiment of the present invention, the UE 211 transmits a request message requiring measurement (such as a tracking area (TA) update message or a service request message) to a network node, and the request message by the UE 211 is received by the network node. Then, the network node obtains context information of the accessible home cells/private network cell 205 from a server maintaining context information of the home cells/private network cells 203, and notifies the UE 211 of the information through a response message. The UE 211 executes measurement by using the context information. The context information includes information on a corresponding cell (ID, a scrambling code, etc.) and information related to measurement control (a threshold, a period, etc.).

Hereinafter, in embodiments of the present invention, the status of the UE 211 is classified into an idle mode (a first embodiment) and a connected mode (a second embodiment), and a measurement method on home cells/private network cells, by the UE 211, will be described based on the classified modes. Also, hereinafter, in the present invention, each of the accessible home cell/private network cell and the public/macro cell includes at least one cell.

Figure 3:
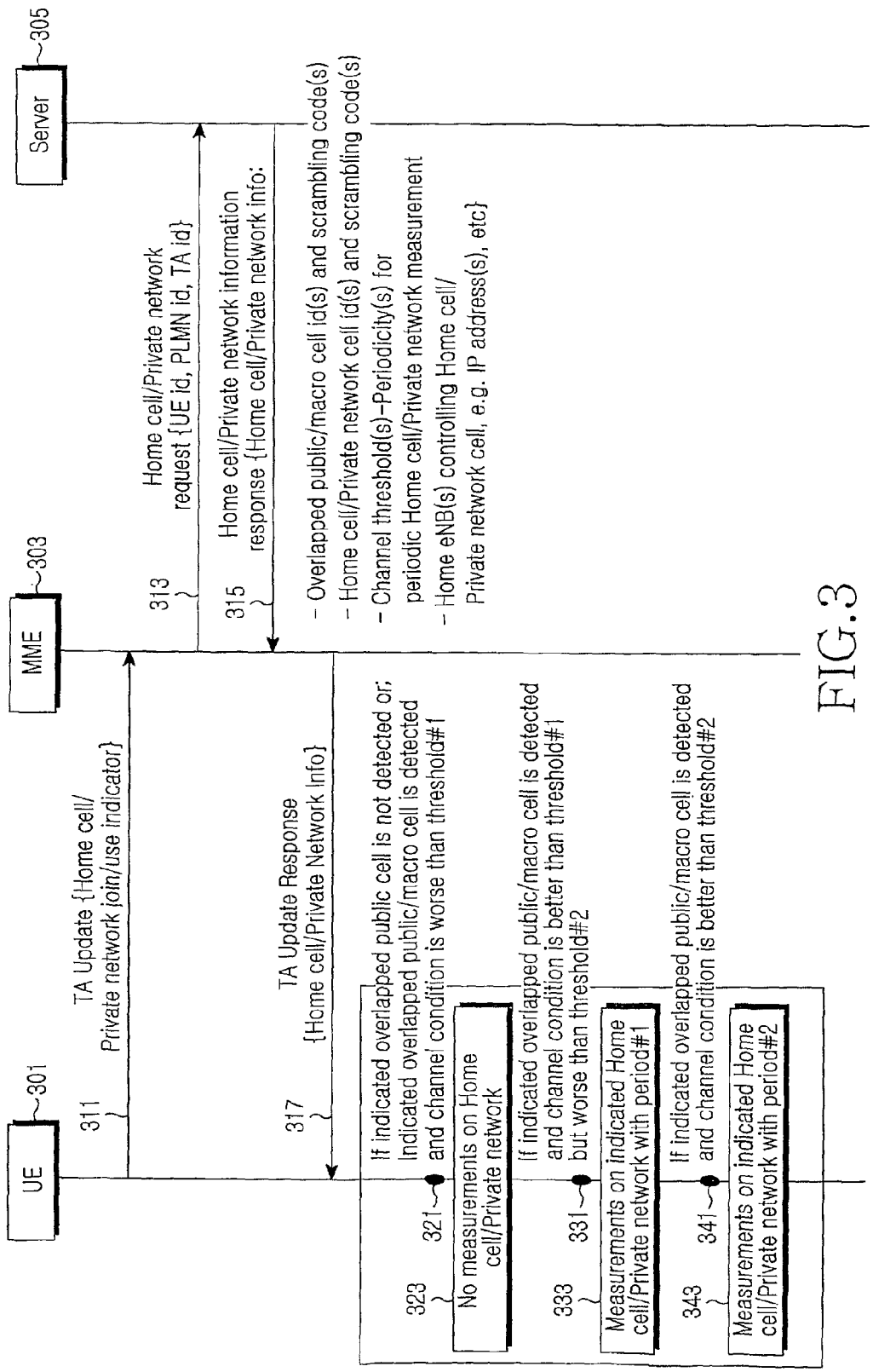
FIG. 3 is a flow diagram illustrating a method of executing measurement on a home cell/private network cell for an idle mode UE in a mobile communication system according to a first embodiment of the present invention.

FIG. 3 is a flow diagram illustrating a method of executing measurement on a home cell/private network cell for an idle mode UE in a mobile communication system according to a first embodiment of the present invention.

Referring to FIG. 3, a reference number 301 indicates a UE, and a reference number 303 indicates a Mobility Management Entity (MME), which is a higher node in charge of context information and mobility information of the idle mode UE 301. A reference number 305 indicates a server storing context information of the home cell/private network cell.

An idle mode refers to a state of the UE 301, in which context information of the UE 301 does not exist in an ENB, the location of the UE 301 is not managed cell by cell but is managed based on a tracking area (TA) for paging, and a UE dedicated channel does not exist.

In step 311, the UE 301 transmits a TA update request message to the MME 303 in order to register the current location of the UE 310 TA by TA. The TA update request message includes an indicator instructing one of register, join, and use of the home cell/private network cell, and the indicator notifies the MME 303 of whether the UE 301 requests register, join, or use of the home cell/private network cell or not.

In step 313, when the indicator of the TA update request message is set as register, join, or use of the home cell/private network cell, the MME 303 transmits a context information request message for the UE 301 to the server 305. The home cell/private network cell information request message may include a UE ID, a PLMN ID indicating a Public Landmark Mobile Network (PLMN) selected by the UE 301, and a TA ID indicating a TA where the UE is currently located.

In step 315, the server 305 determines home cell/private network cell context information on at least one home cell/private network cell accessible by the UE 301 in accordance with the home cell/private network cell information request message, and transmits a home cell/private network cell information response message including the home cell/private network cell context information to the MME 303.

The home cell/private network cell information response message includes identification information of the accessible home cell/private network cell (a cell ID, channel scrambling code information, etc.), information on at least one public/macro cell locally overlapping with the accessible home cell/private network cell (a cell ID, channel scrambling code information, etc.), a measurement execution period of the accessible home cell/private network cell, a channel condition threshold of the public/macro cell locally overlapping with the accessible home cell/private network cell, or the accessible home cell/private network cell, which determines the measurement execution period, eNB information (an IP address, etc.) controlling the home cell/private network cell, etc.

For the measurement execution period, and the channel condition threshold with respect to the channel condition determining the measurement execution period, when a measurement execution period and a channel condition threshold of the public/macro cell locally overlapping with the accessible home cell/private network cell are used, a measurement execution period on the accessible home cell/private network cell to be mapped may be varied according to a measured channel condition of the public/macro cell. For example, if the measured channel condition of the public/macro cell locally overlapping with the accessible home cell/private network cell is worse than a threshold 1, measurement on the accessible home cell/private network cell is not executed, if the condition is greater than the threshold 1 and worse than a threshold 2, measurement on the accessible home cell/private network cell is executed with a measurement period 1, and if the condition is greater than the threshold 2 measurement on the accessible home cell/private network cell is executed with a measurement period .

In step 317, the MME 303, based on the home cell/private network cell information response message, transmits a TA update response message including the home cell/private network cell context information on the accessible home cell/private network cell to the UE 301.

Although in the first embodiment of the present invention, the home cell/private network cell context information is set by only the server 305, the MME 303 may store or generate the whole or part of the context information.

Hereinafter, with reference to step 321 to step 343, after the TA update response message is transmitted to the UE 301, a measurement execution process by the UE 301 will be described. In the present invention, a specific period #N includes a specific period #N includes continuous measurement execution and no measurement execution.

In step 321, the UE 301, based on the TA update response message, executes measurement on the public/macro cell locally overlapping with the accessible home cell/private network cell. Then, as a result of the measurement, when the public/macro cell is not detected or; even detected with a channel condition of not better than a threshold #1, the UE proceeds to step 323. In step 323, provided that the channel condition of the detected public/macro cell is not better than a threshold #1, the UE 301 does not execute measurement on the accessible home cell/private network cell instructed through the TA update response message.

In step 331, the UE 301, based on the TA update response message, executes measurement on the public/macro cell locally overlapping with the accessible home cell/private network cell. Then, as a result of the measurement, if the channel condition of the public/macro cell is better than a threshold #1 but not better than a threshold #2, the UE proceeds to step 333. In step 333, provided that the channel condition of the detected public/macro cell is better than a threshold #1 but not better than a threshold #2, the UE 301 periodically executes measurement on the accessible home cell/private network cell instructed through the TA update response message with a period #1.

To overlapping public/macro cells, only one threshold may be given or different thresholds may be given, respectively. Also, if a plurality of public/macro cells are given, the UE executes measurement on the plurality of public/macro cells. As a result of the measurement, if at least one of the channel conditions of the public/macro cells is better than a threshold, the UE periodically executes measurement on an instructed accessible home cell/private network cell with a corresponding period.

In step 341, the UE 301, based on the TA update response message, executes measurement on the public/macro cell locally overlapping with the accessible home cell/private network cell. Then, as a result of the measurement, if the channel condition of the public/macro cell is better than a threshold #2, the UE proceeds to step 343. In step 343, provided that the channel condition of the public/macro cell is better than the threshold #2, the UE 301 periodically executes measurement on the accessible home cell/private network cell instructed through the TA update response message, with a period #2.

Finally, the UE 301 determines cell reselection of a cell selected according to the execution result of the above described measurement. The above description is based on the assumption that as information for determining a measurement execution period of the accessible home cell/private network cell, a channel condition threshold of the public/macro cell locally overlapping with the accessible home cell/private network cell is set. Meanwhile, if, as information for determining the measurement execution period of the accessible home cell/private network cell, a channel condition threshold of the accessible home cell/private network cell is set, the UE operates as follows. In other words, if the channel condition of a measured accessible home cell/private network cell is not better than a threshold #1, the UE executes measurement on the accessible home cell/private network cell with a period #0, if the channel condition of the measured home cell/private network cell is better than the threshold #1 and not better than a threshold #2, the UE executes measurement on the accessible home cell/private network cell with a period #1, and if the channel condition of the measured accessible home cell/private network cell is better than the threshold #2 the UE executes measurement on the accessible home cell/private network cell with a period #2.

To indicated overlapping public/macro cells, only one threshold may be given or different thresholds may be given, respectively. Also, as another embodiment, a threshold may be signaled through a TA update response or a service request response, or may be defined through hard coding as one value in a UE. In comparing the measured channel condition to the specific threshold, in order to prevent a measurement period from being varied according to a momentary change in the channel condition, a channel condition measured for a determined time interval may be used.

Figure 4:
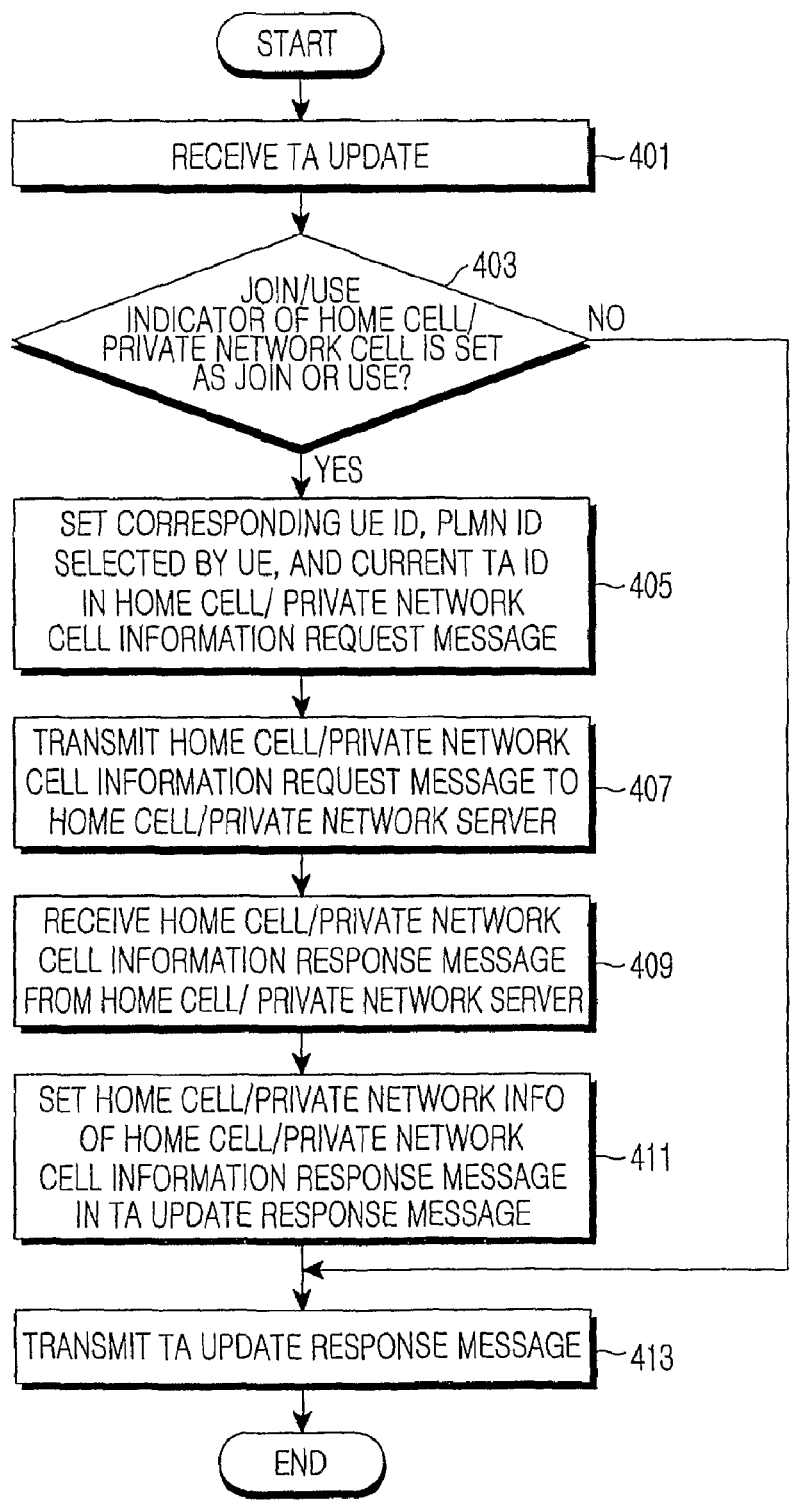
FIG. 4 is a flow diagram illustrating a method of executing measurement on a home cell/private network cell for an idle mode UE, by a network node of a mobile communication system according to a first embodiment of the present invention.

FIG. 4 is a flow diagram illustrating a method of executing measurement on a home cell/private network cell for an idle mode UE, by a network node of a mobile communication system according to a first embodiment of the present invention.

In step 401, the MME 303 receives a TA update request message from the UE 301. In step 403, the MME 303 determines if an indicator instructing one of register, join, and use of a home cell/private network cell is set as register, join, or use in the TA update request message. When the indicator is set as register, join, or use, the MME proceeds to step 405, and when the indicator is set as no-register, no-join, or no-use, the MME proceeds to step 413.

In step 405, the MME 303 sets a corresponding UE ID, a PLMN ID selected by the UE, and a current TA ID, in a home cell/private network cell information request message. In step 407, the MME 303 transmits the home cell/private network cell information request message to the server 305 managing home cell/private network cell context information.

In step 409, the MME 303 receives context information on a home cell/private network cell accessible by the UE 301 through a home cell/private network cell information response message, from the server 305. After setting the context information on the home cell/private network cell in a TA update response message In step 411, the MME 303 transmits the TA update response message to the UE 301 in step 413.

Figure 5:
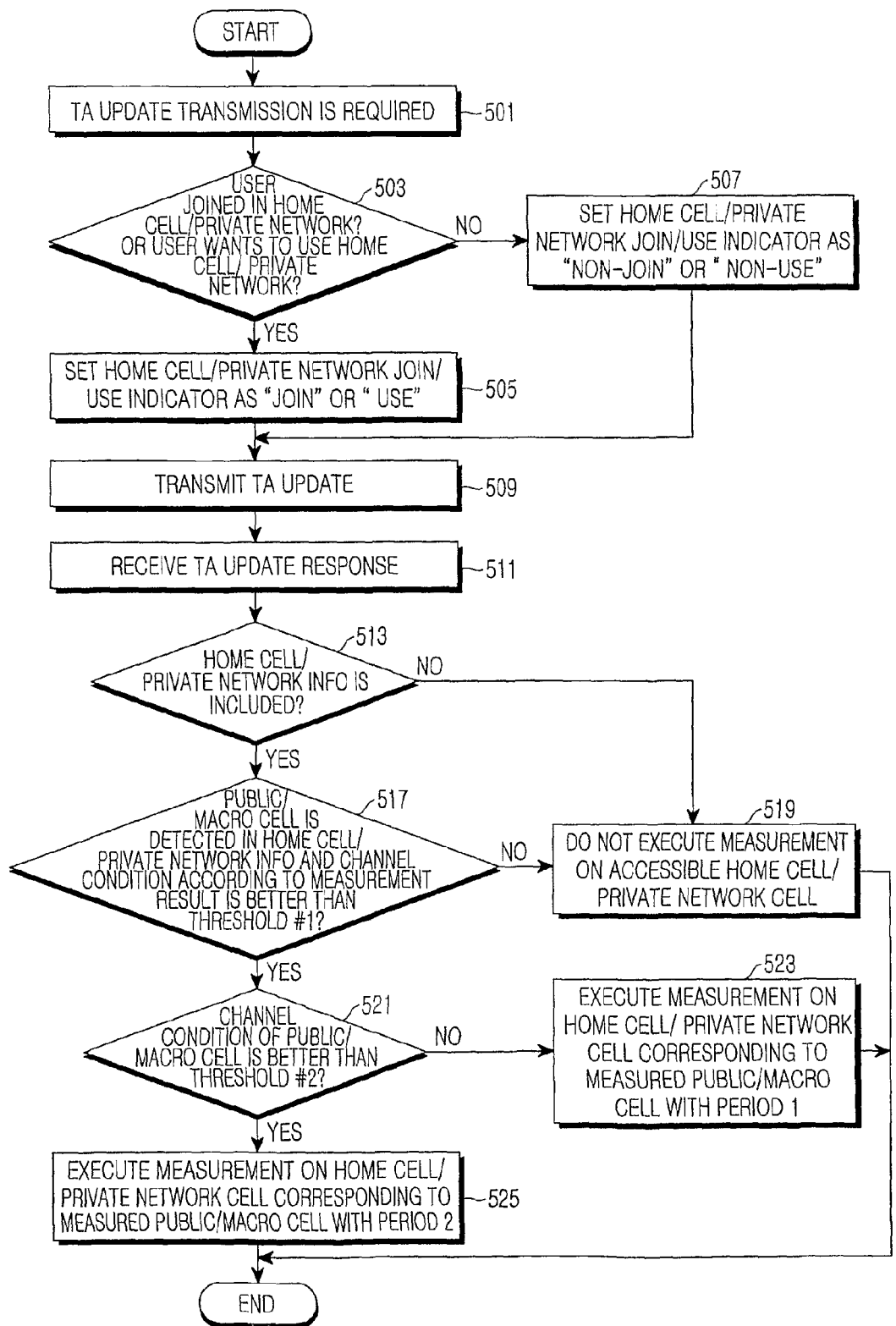
FIG. 5 is a flow diagram illustrating a method of executing measurement on a home cell/private network cell for an idle mode UE, by a UE of a mobile communication system according to a first embodiment of the present invention.

FIG. 5 is a flow diagram illustrating a method of executing measurement on a home cell/private network cell for an idle mode UE, by a UE of a mobile communication system according to a first embodiment of the present invention.

When a TA update message is required to be transmitted in order to register a current location TA by TA. In step 501, the UE 301 determines, in step 503, if a user wants to request register, join, or use of the home cell/private network cell. When the user wants to request register, join, or use, the UE 301 proceeds to step 505, and when the user does not want to request register, join, or use, the UE 301 proceeds to step 507.

In step 505, the UE 301 sets an indicator instructing one of register, join, and use of the home cell/private network cell, as register, join, or use. Meanwhile, in step 507, the UE 301 sets the indicator as no-register, no-join, or no-use. After transmitting the TA update message including the indicator to the MME 303 In step 509, the UE 301 receives a TA update response message from the MME 303 in step 511.

Hereinafter, referring to steps 513 to 525, after the TA update response message is received, measurement execution of the UE in an idle mode will be described.

In step 513, the UE 301 determines if the received TA update response message includes home cell/private network cell context information. When the home cell/private network cell context information is not included, the UE proceeds to step 519 and does not execute measurement on the home cell/private network cell, and when the home cell/private network cell context information is included, the UE proceeds to step 517.

In step 517, the UE 301 determines if at least one public/macro cell locally overlapping with at least one accessible home cell/private network cell is detected, and the channel condition according to a measurement result on the accessible public/macro cell is better than a threshold #1 included in the home cell/private network cell context information. When the channel condition is not better than the threshold #1, the UE proceeds to step 519, and when the channel condition is better than the threshold #1, the UE proceeds to step 521. In step 519, since the channel condition is not better than the threshold #1 included in the home cell/private network cell context information, the UE 301 does not execute measurement on the accessible home cell/private network cell.

Meanwhile, in step 521, the UE 301 determines if the channel condition is better than a threshold #2. When the channel condition is not better than the threshold #2, the UE proceeds to step 523, and when the channel condition is better than the threshold #2, the UE proceeds to step 525. In step 523, the UE 301 periodically executes measurement on the accessible home cell/private network cell corresponding to the measured public/macro cell, with a period #1 included in the home cell/private network cell context information. Meanwhile, in step 525, the UE 301 periodically executes measurement on the accessible home cell/private network cell corresponding to the measured public/macro cell, with a period #2 included in the home cell/private network cell context information.

Although the above described first embodiment is based on the assumption that a threshold and a measurement execution period are signaled through a TA update response message, the threshold and measurement execution period may be fixedly set through hard coding in another embodiment. Also, although the first embodiment of the present invention is based on the assumption of two thresholds and two periods, it is possible to use one threshold value/period or a plurality of thresholds/periods.

Figure 6:
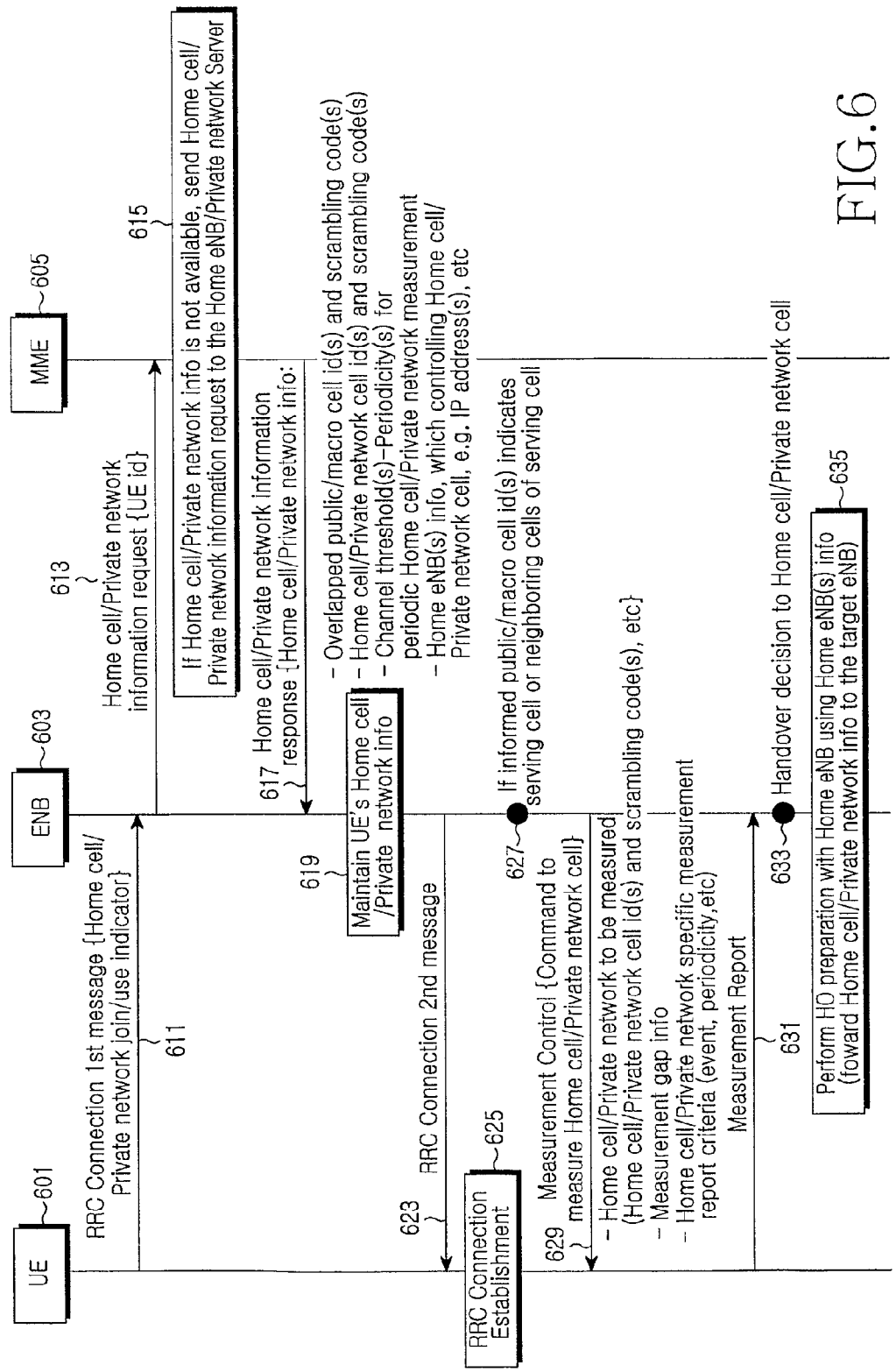
FIG. 6 is a flow diagram illustrating a method of executing measurement on a home cell/private network cell for a connected mode UE in a mobile communication system according to a second embodiment of the present invention.

FIG. 6, is a flow diagram illustrating a method of executing measurement on a home cell/private network cell for a connected mode UE in a mobile communication system according to a second embodiment of the present invention.

In FIG. 6, a reference number 601 indicates a UE, and a reference number 603 indicates an ENB controlling a serving cell of the UE 601. Also, a reference number 605 indicates an MME communicating with the UE 601

A connected mode refers to a state of the UE 601, in which context information of the UE 601 exists in the ENB 603, a dedicated channel exists between the UE 601 and the ENB 603, and the location of the UE 601 is managed cell by cell.

In step 611, the UE 601 transmits a first message for Radio Resource Control (RRC) connection to the ENB 603. Herein, the first message includes an indicator instructing one of register, join, and use of the home cell/private network cell. Then, the establishment of the RRC connection is to generate a channel for transmitting/receiving a control message between the UE 601 and the ENB 603, and for the ENB 603, to receive UE context information from a higher node of a corresponding network.

In 613, the ENB 603 transmits a home cell/private network cell information request message including context information of the UE 601, etc. to the MME 605 by using the transmitted first message.

In step 615, if the home cell/private network cell information request message includes home cell/private network cell context information of the UE 601, the MME 605 proceeds to step 617. Then, in step 617, the MME 605 transmits a home cell/private network cell information response message to the ENB 603.

Meanwhile, in step 615, if the home cell/private network cell information request message does not include the home cell/private network cell context information of the UE 601, the MME 605 transmits a request message on the context information to a server including home cell/private network cell context information, and receives the home cell/private network cell context information from the server.

In step 619, the ENB 603 stores context information on at least one home cell/private network cell accessible by the UE 601, from the transmitted home cell/private network cell information response message. Then in step 623, the ENB 603 transmits a second message for RRC connection, the message including the context information on the accessible home cell/private network cell, to the UE 601.

Accordingly, in step 625, the establishment of RRC connection between the UE 601 and the ENB 603 is completed.

Hereinafter, referring to steps 627 to 635, measurement execution of the UE in a connected mode will be described.

In step 627, based on the second message for RRC connection, if at least one public/macro cell locally overlapping with the accessible home cell/private network cell indicates a serving cell of the current UE 601 or neighboring cells of the serving cell, the ENB 603 proceeds to step 629. In step 629, the ENB 603 transmits a measurement control message instructing measurement on the accessible home cell/private network cell to the UE 601. The measurement control message includes information on an accessible home cell/private network cell or a home cell/private network cell on which measurement is expected to be changed or stopped, information on a measurement gap, and information on a measurement report method of a home cell/private network cell. The information on the home cell/private network cell on which measurement is to be executed or measurement execution is to be changed or stopped includes an ID, a channel scrambling code, etc. of the accessible home cell/private network cell; and the measurement gap includes measurement timing of the accessible home cell/private network cell arranged in a different frequency from the public/macro cell. Also, the information on a measurement report method of the accessible home cell/private network cell includes a measurement report period for a periodical measurement report, and parameters for a measurement report method by an event. The parameters related to the event measurement report method include an event ID (for example, an event in which as a result of measurement on a home cell/private network cell, the channel condition is better than an indicated threshold, or the channel condition was better than the threshold but then is worse than the threshold), a time causing a measurement report (Time to trigger: a measurement report is executed only when the condition of an occurring event is continuously maintained for a predetermined time), etc. As the parameters related to the measurement report method, a different value from that of the public/macro cell may be signaled. In other words, parameters related a measurement report method specialized for the accessible home cell/private network cell may be set.

After receiving the measurement control message and executing measurement on the accessible home cell/private network cell, the UE 601, in step 631, transmits a measurement report message to the ENB 603.

After receiving the measurement report message, the ENB 603 decides to execute handover to the home cell/private network cell included in the measurement report message in step 633, and executes handover to a target ENB by using target ENB information (IP address, etc.) controlling a target home cell/private network cell received through step 617.

In step 635, upon occurrence of handover, the ENB 603 transmits context information on the accessible home cell/private network cell received through step 617, to the target ENB controlling the target cell of the handover.

Figure 7:
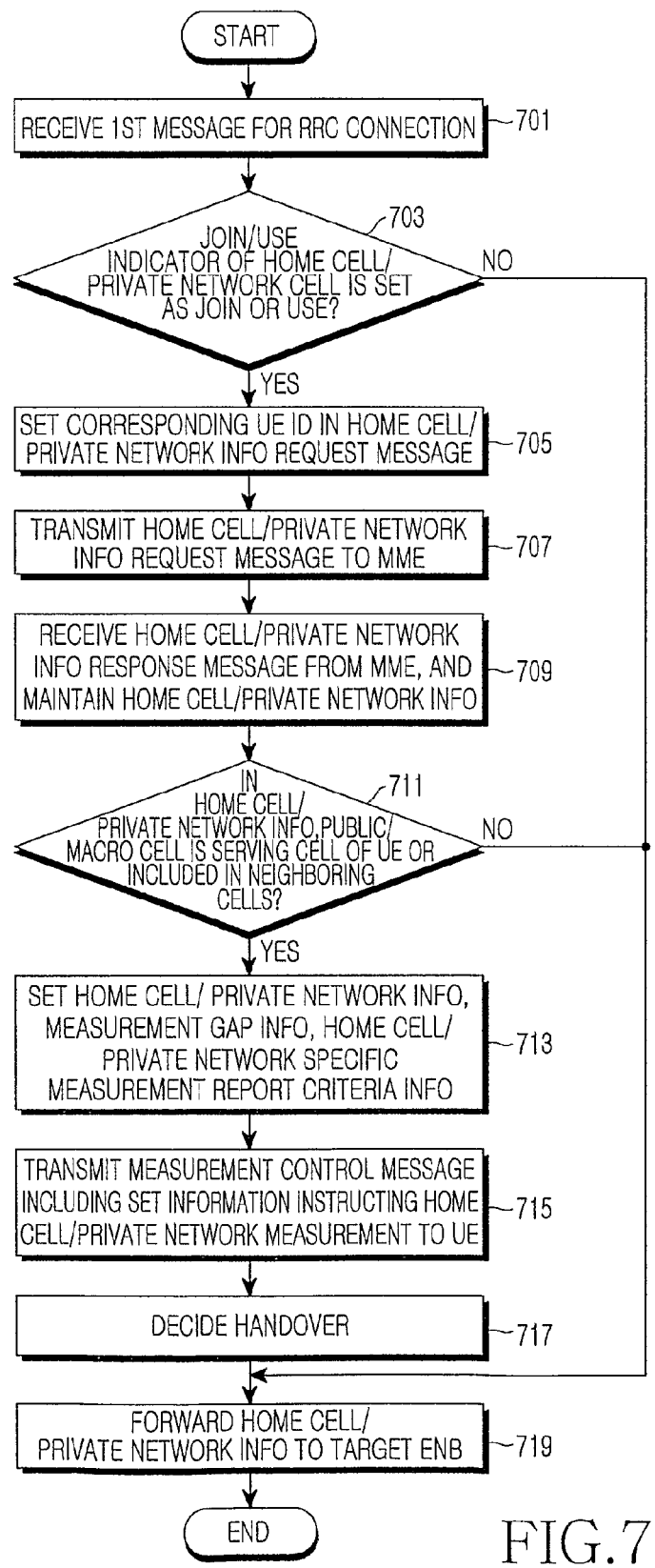
FIG. 7 is a flow diagram illustrating a method of executing measurement on a home cell/private network cell for a connected mode UE, by a network node of a mobile communication system according to a second embodiment of the present invention.

FIG. 7 is a flow diagram illustrating a method of executing measurement on a home cell/private network cell for a connected mode UE, by a network node of a mobile communication system according to a second embodiment of the present invention.

The network node according to a second embodiment of the present invention corresponds to the above described ENB 603.

In step 701, the ENB 603 receives a first message for RRC connection from the UE 601.

In step 703, the ENB 603 determines if the indicator is set as register, join, or use in the first message. When the indicator is set as register, join, or use, the ENB proceeds to step 703, and when the indicator is set as no-register, no-join, or no-use, the ENB finishes the measurement process of the UE 601 in a connected mode.

After setting a corresponding UE ID in a home cell/private network cell information request message in step 705, the ENB 603 transmits, in step 707, the set home cell/private network cell information request message to the MME 605.

In step 709, the ENB 603 receives context information on a home cell/private network cell accessible by the UE 601 from the MME 605 through a home cell/private network cell information response message.

In step 711, the ENB determines if at least one public/macro cell locally overlapping with the accessible home cell/private network cell included in the received home cell/private network cell information response message is included in a current serving cell of the UE 601 or neighboring cells of the serving cell. When the public/macro cell is included, the ENB proceeds to step 713, and when the public/macro cell is not included, the ENB finishes the measurement process of the UE 601.

In step 713, based on the context information included in the home cell/private network cell information response message, the ENB 603 generates a control message instructing measurement on the accessible home cell/private network cell. Herein, the control message includes information on a home cell/private network cell on which measurement is to be executed (that is, information on an accessible home cell/private network cell) or on a home cell/private network cell on which measurement execution is to be changed or stopped, information on a measurement gap, and information on a measurement report method of a home cell/private network cell.

Then, in step 715, the ENB 603 transmits the control message for measurement on the accessible home cell/private network cell to the UE 601.

Hereinafter, step 717 and step 719 describe operations of a source ENB upon the occurrence of handover.

The source ENB decides to execute handover in step 717, and forwards home cell/private network cell context information included in the measurement control message to a target ENB in step 719.

Figure 8:
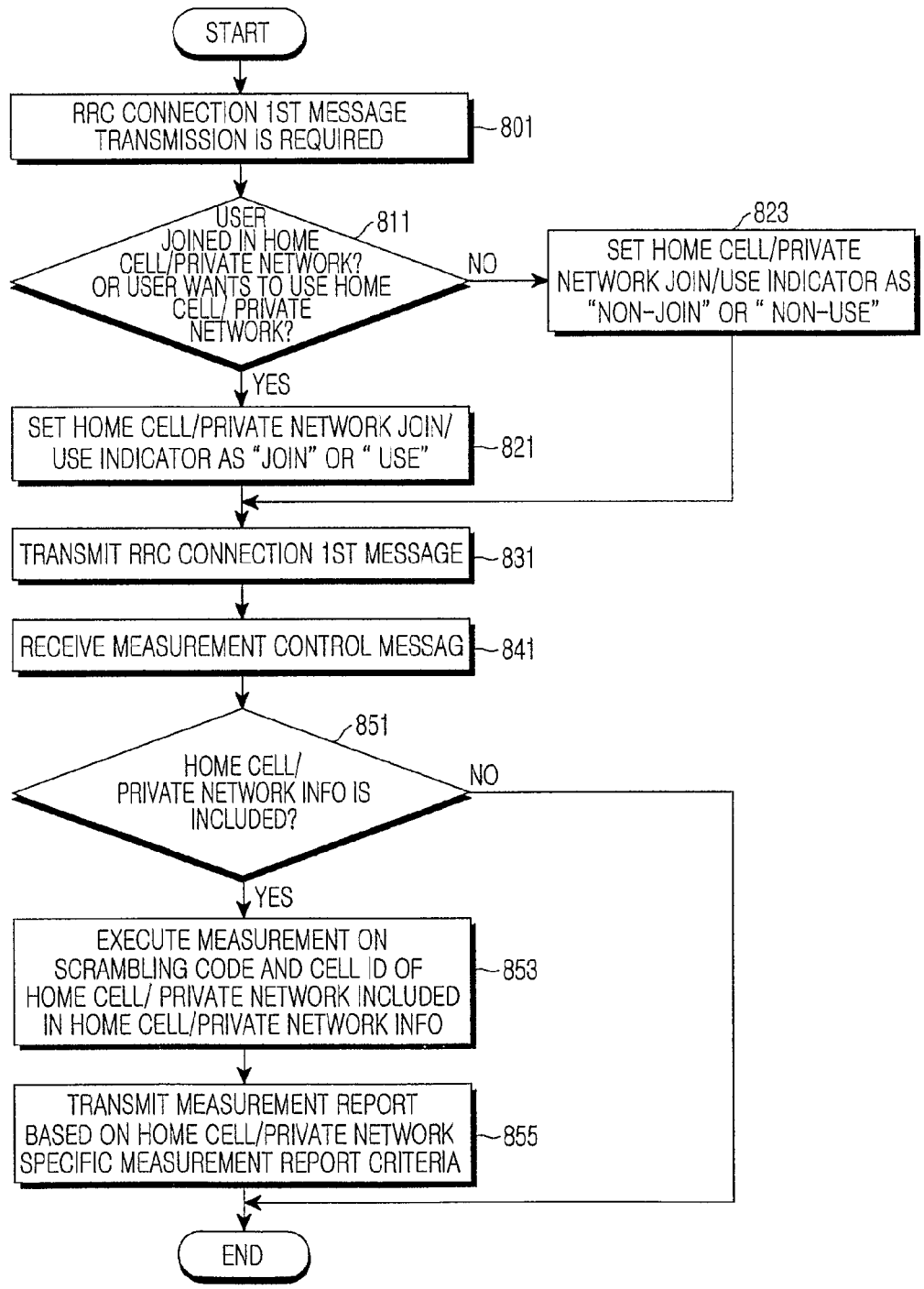
FIG. 8 is a flow diagram illustrating a method of executing measurement on a home cell/private network cell for a connected mode UE, by a UE of a mobile communication system according to a second embodiment of the present invention.

FIG. 8 is a flow diagram illustrating a method of executing measurement on a home cell/private network cell for a connected mode UE, by a UE of a mobile communication system according to a second embodiment of the present invention.

The UE 601 determines, in step 801, that a first message for RRC connection is required in order to enter from an idle mode to a connected mode, and determines, in step 811, if a user wants to request one of register, join, and use of a home cell/private network cell. When the user wants to request register, join, or use of the home cell/private network cell, the UE 601 proceeds to step 821, and when the user does not want to request register, join, or use of the home cell/private network cell, the UE 601 proceeds to step 823.

In step 821, the UE 601 sets an indicator instructing one of register, join, and use of the home cell/private network cell, as register, join, or use.

Meanwhile, in step 823, the UE 601 sets the indicator as no-register, no-join, or no-use.

Then, in step 831, the UE 601 transmits the first message for RRC connection, the first message including the indicator, to the ENB 603.

Hereinafter, referring to steps 841 to 855, sequential processes executed by the UE 601, in which after receiving a control message instructing measurement on the accessible home cell/private network cell from the ENB 603 and executing the measurement, the UE executes a report on the measurement result, will be described.

The UE 601 receives, in step 841, the measurement control message from the ENB 603, and then determines, in step 851, if the measurement control message includes information on the accessible home cell/private network cell as a measurement object. When the measurement control message includes the information on the accessible home cell/private network cell, the UE 601 proceeds to step 853, and when the measurement control message does not include the information on the accessible home cell/private network cell, the UE 601 finishes measurement operation.

In step 853, the UE 601 executes measurement by using a scrambling code and a cell ID of the accessible home cell/private network cell included in the context information. Then, in step 855, the UE 601 transmits a measurement report message including a execution result of the measurement to the ENB 603, in accordance with measurement report method parameters specialized for a home cell/private network cell measurement report method.

Figure 9:
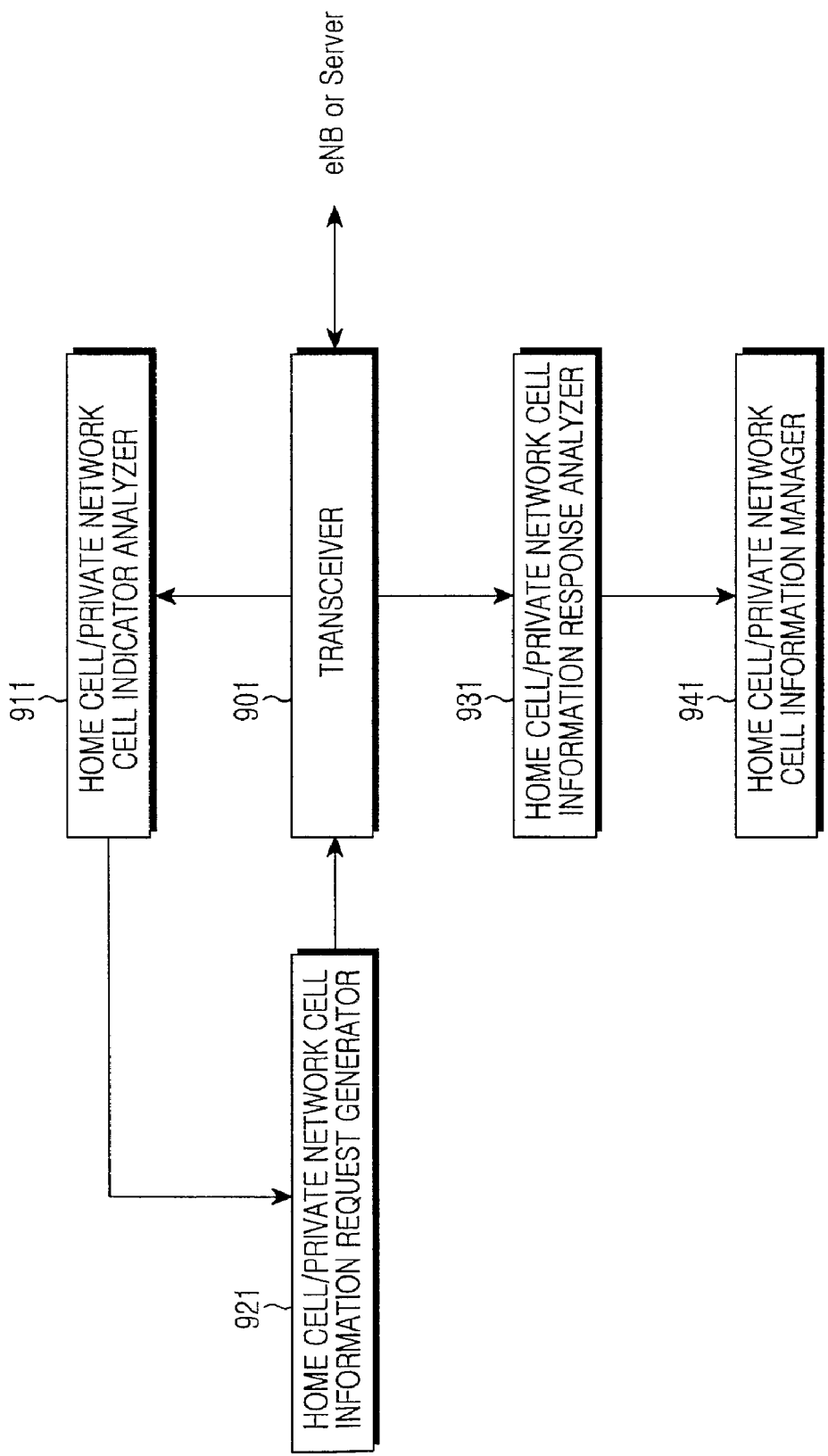
FIG. 9 is a block diagram illustrating configuration of a network node according to a first embodiment of the present invention. In the first embodiment of the present invention, the network node corresponds to a MIME 303.

FIG. 9 is a block diagram illustrating configuration of a network node according to a first embodiment of the present invention. In the first embodiment of the present invention, the network node corresponds to a MME 303.

In a mobile communication system according to a first embodiment of the present invention, the network node includes a transceiver 901 and a controlling unit.

In FIG. 9, the controlling unit includes a home cell/private network cell indicator analyzer 911, a home cell/private network cell information request generator 921, a home cell/private network cell information response analyzer 931, and a home cell/private network cell information manager 941.

The transceiver 901, which is connected to an ENB or a home cell/private network cell server 305, receives a TA update request message and transfers the message to the home cell/private network cell indicator analyzer 911, and transfers a response message received from the server 305 to the home cell/private network cell information response analyzer 931.

The home cell/private network cell indicator analyzer 911 analyzes an indicator field instructing one of register, join, and use of a home cell/private network cell. As a result of the analysis, when the field indicates register, join, or use of the home cell/private network cell, the home cell/private network cell indicator analyzer 911 transfers a corresponding indicator to the home cell/private network cell information request message generator 921.

The home cell/private network cell information request message generator 921 generates a home cell/private network cell information request message in order to request context information of a home cell/private network cell accessible by a UE 301, and transfers the message to the transceiver 901. The transceiver 901 transmits the transferred home cell/private network cell information request message to the server 305.

Then, the home cell/private network cell information response analyzer 931 receives a home cell/private network cell information response message from the server 305, analyzes the home cell/private network cell information response message, and transfers analyzed home cell/private network cell context information to the home cell/private network cell information manager 941. The home cell/private network cell information manager 941 manages the transferred home cell/private network cell context information.

Figure 10:
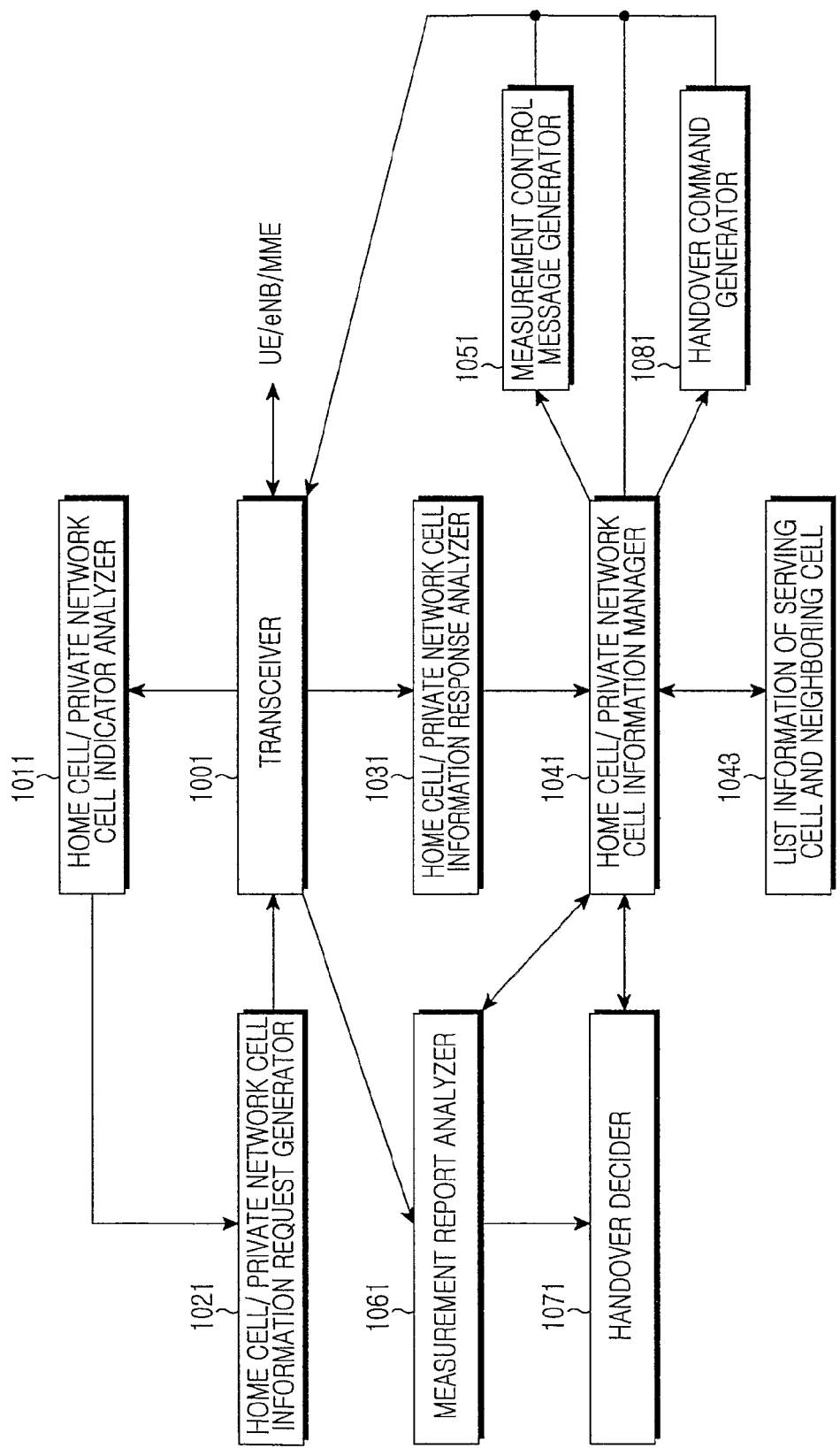
FIG. 10 is a block diagram illustrating configuration of a network node according to a second embodiment of the present invention. In the second embodiment of the present invention, the network node corresponds to an ENB 603.

FIG. 10 is a block diagram illustrating configuration of a network node according to a second embodiment of the present invention. In the second embodiment of the present invention, the network node corresponds to an ENB 603.

The network node according to the second embodiment of the present invention includes a transceiver 1001 and a controlling unit.

In FIG. 10, the controlling unit includes a home cell/private network cell indicator analyzer 1011, a home cell/private network cell information request generator 1021, a home cell/private network cell information response analyzer 1031, a home cell/private network cell information manager 1041, a measurement control message generator 1051, a measurement report analyzer 1061, a handover decider 1071 and a handover command generator 1081.

The transceiver 1001 is in charge of communication with a UE 601, the neighboring ENB 603 and a neighboring MME 605. In the communication, respective entities may have substantially different physical transceivers.

The transceiver 1001 transfers a first message received from the UE 601, the message being for RRC connection, to the home cell/private network cell context indicator analyzer 1011. The home cell/private network cell context indicator analyzer 1011 analyzes an indicator field instructing one of register, join, and use of a home cell/private network cell. As a result of the analysis, when the field indicates register, join, or use of the home cell/private network cell, the home cell/private network cell indicator analyzer 1011 transfers a corresponding indicator to the home cell/private network cell information request message generator 1021.

The home cell/private network cell information request message generator 1021 generates a home cell/private network cell information request message in order to request home cell/private network cell context information, and transfers the message to the transceiver 1001. The transceiver 1001 transmits the transferred home cell/private network cell information request message to the MME 605.

Then, the transceiver 1001 receives a home cell/private network cell information response message from the MME 605 and transfers the message to the home cell/private network cell information response analyzer 1031. The home cell/private network cell information response analyzer 1031 analyzes the home cell/private network cell information response message, and transfers analyzed home cell/private network cell context information to the context information manager 1041.

The measurement report analyzer 1061 analyzes a measurement report received from the UE 601 via the transceiver 1001.

Then, the context information manager 1041 manages the home cell/private network cell context information while transferring list information 1043 on a serving cell and neighboring cells, and the analyzed measurement report to the measurement control message generator 1051.

The measurement control message generator 1051 generates a measurement control message with reference to the transferred list information on the serving cell and the neighboring cells and the transmitted measurement report, and transmits the measurement control message to the UE via the transceiver 1001.

Then, the handover decider 1071 decides to execute handover based on the measurement report, and the transfers the decision to the handover command generator 1081 via the context information manager 1041. The handover command generator 1081 generates a handover command message and transmits the message to the UE 601 via the transceiver 1001, and the context information manager 1041 forwards home cell/private network cell context information, which has been managed by the manager 1041, to a target ENB FIG. 11 is a block diagram illustrating the configuration of a UE according to first and second embodiments of the present invention.

Figure 11:
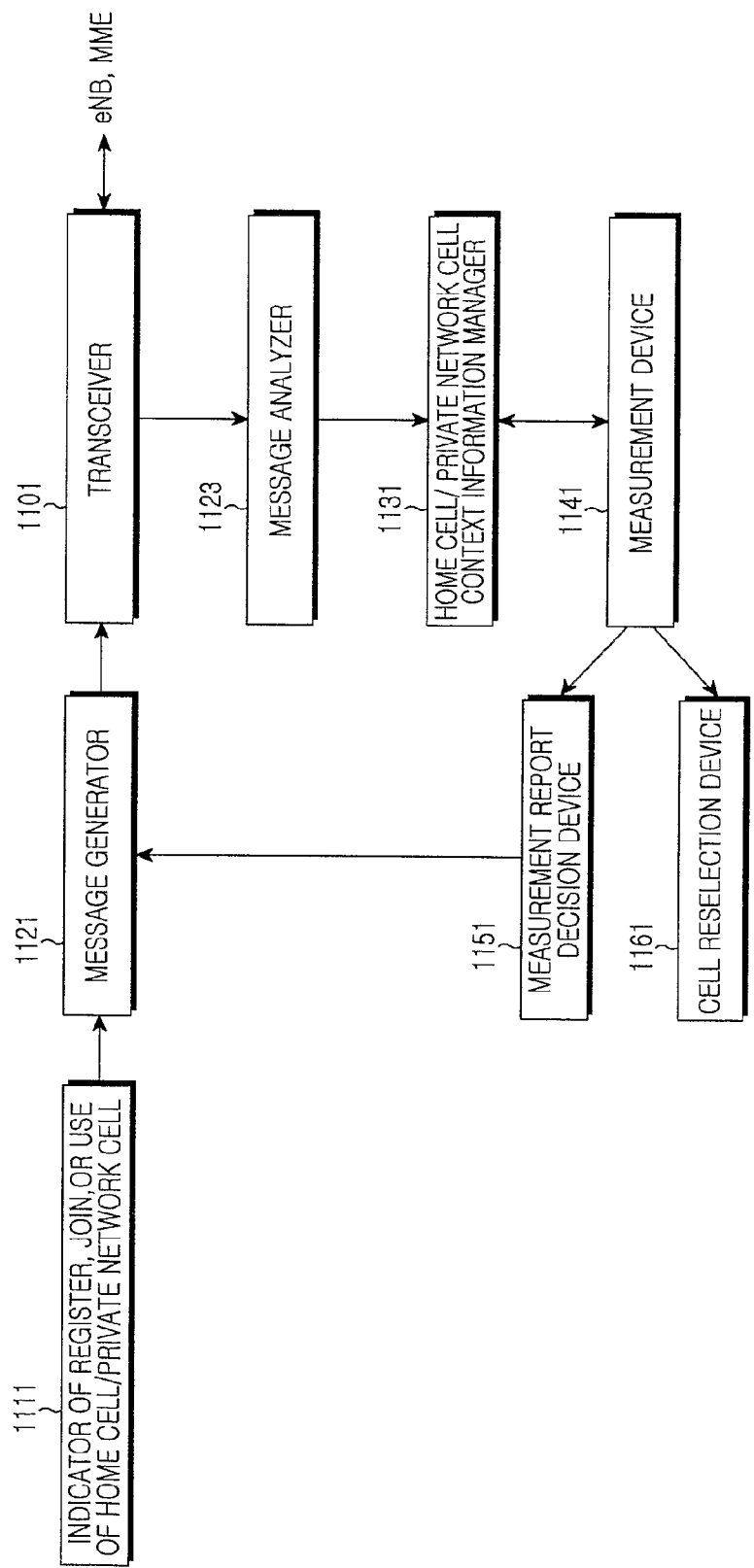
FIG. 11 is a block diagram illustrating the configuration of a UE according to first and second embodiments of the present invention.

In FIG. 11, a transceiver 1101 is in charge of communication with an ENB. A message generator 1121 sets an indicator instructing register, join, or use of a home cell/private network cell with reference to information on register, join, or use of the home cell/private network cell 1111, generates at least one message of a TA update request message including the set indicator and a first message for RRC connection, and then transfers the generated message to the transceiver 1101 and allows the transceiver to transmit the message to the ENB or an MME. Although a physically connected entity is the ENB, it is possible to transmit the message to the MME via the ENB.

Then, a message analyzer 1123 analyzes field information of the request message transmitted from the ENB or the MME via the transceiver 1101, and transfers analyzed information to a home cell/private network cell context information manager 1131. The home cell/private network cell context information manager 1131 manages the transferred home cell/private network cell context information and transfers the information to a measurement device 1141. The measurement device 1141 executes measurement by using the home cell/private network cell context information. When the UE is in an idle mode, the measurement device transfers the result of the measurement to a cell reselection device 1161, and when the UE is in a connected mode, the measurement device transfers the result of the measurement to a measurement report decision device 1151, The cell reselection device 1161 executes cell reselection, and the measurement report decision device 1151 decides a measurement report in accordance with a measurement report method specialized for a corresponding home cell/private network cell, and transfers the report to a message generator 1121.

The message generator 1121 generates a measurement report message in accordance with the decided measurement report, and then transfers the message to the transceiver 1101 and allows the transceiver to transmit the message to the ENB.

In the present invention, it is possible to execute measurement by using information of at least one public/macro cell locally overlapping with an accessible home cell/private network cell in accordance with service request of a UE. Therefore, since the measurement is executed on only a UE accessible home cell/private network cell based on information transmitted from a network, power consumption of the UE may decrease.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of measurement on a home cell/private network cell, by a user equipment (UE), in a mobile communication system, the method comprising the steps of:
   transmitting a request message requesting the measurement to a network node, the request message comprising an indicator instructing at least one of register, join, and use of the home cell/private network cell;
   receiving a response message corresponding to the request message from the network node, the response message comprising context information for measurement control of at least one home cell/private network cell accessible by the UE; and
   selectively executing measurement on the accessible home cell/private network cell by using the context information,
   wherein the context information comprises identification information of the accessible home cell/private network cell, information on a public/macro cell locally overlapping with the accessible home cell/private network cell, at least one measurement execution period on the accessible home cell/private network cell, at least one channel condition threshold for determining the measurement execution period, and network node information controlling the accessible home cell/private network cell.

2. The method as claimed in claim 1, wherein the step of selectively executing the measurement comprises the steps of:
   when the public/macro cell is detected by using the information on the public/macro cell, determining if a channel condition of the public/macro cell is better than a first channel condition threshold, based on a result of measurement on the public/macro cell;
   omitting execution of measurement on the accessible home cell/private network cell when the channel condition of the public/macro cell is worse than the first channel condition threshold;
   determining if the channel condition of the public/macro cell is better than a second channel condition threshold when the channel condition of the public/macro cell is better than the first channel condition threshold;
   executing measurement on the accessible home cell/private network cell with a first measurement execution period when the channel condition of the public/macro cell is worse than the second channel condition threshold; and
   executing measurement on the accessible home cell/private network cell with a second measurement execution period when the channel condition of the public/macro cell is better than the second channel condition threshold.

3. A method of measurement on a home cell/private network cell, by a network node, in a mobile communication system, the method comprising the steps of:
   receiving a request message requesting the measurement from a UE, the request message comprising an indicator instructing at least one of register, join, and use of the home cell/private network cell;
   obtaining context information for measurement control of at least one home cell/private network cell accessible by the UE from a higher node in accordance with the request message; and
   transmitting a response message comprising the context information to the UE,
   wherein the context information comprises identification information of the accessible home cell/private network cell, information on a public/macro cell locally overlapping with the accessible home cell/private network cell, at least one measurement execution period on the accessible home cell/private network cell, at least one channel condition threshold for determining the measurement execution period, and network node information controlling the accessible home cell/private network cell.

4. A UE executing measurement on a home cell/private network cell comprises:
   a transceiver for transmitting a request message requesting the measurement to a network node, the request message comprising an indicator instructing at least one of register, join, and use of the home cell/private network cell, and receiving a response message in accordance with the request message, the response message comprising context information for measurement control of at least one home cell/private network cell accessible by the UE; and
   a controlling unit for generating the request message and selectively executing measurement on the accessible home cell/private network cell by using the context information,
   wherein the context information comprises identification information of the accessible home cell/private network cell, information on a public/macro cell locally overlapping with the accessible home cell/private network cell, at least one measurement execution period on the accessible home cell/private network cell, at least one channel condition threshold for determining the measurement execution period, and network node information controlling the accessible home cell/private network cell.

5. The UE as claimed in claim 4, wherein the controlling unit executes measurement on the public/macro cell if the public/macro cell is detected by using information of the public/macro cell, and then as a result of the measurement, determines if a channel condition of the public/macro cell is better than a first channel condition threshold;
   omits execution of measurement on the accessible home cell/private network cell when the channel condition of the public/macro cell is worse than the first channel condition threshold;
   determines if the channel condition of the public/macro cell is better than a second channel condition threshold when the channel condition of the public/macro cell is better than the first channel condition threshold;
   executes measurement on the accessible home cell/private network cell with a first measurement execution period when the channel condition of the public/macro cell is worse than the second channel condition threshold; and
   executes measurement on the accessible home cell/private network cell with a second measurement execution period when the channel condition of the public/macro cell is better than the second channel condition threshold.

6. A network node executing measurement on a home cell/private network cell comprises:
   a controlling unit for: obtaining context information on at least one home cell/private network cell accessible by a UE from a higher node, in accordance with a request message from the UE, the request message requesting the measurement and comprising an indicator instructing at least one of register, join, and use of the home cell/private network cell; and generating a response message comprising context information for measurement on the accessible home cell/private network cell; and
   a transceiver for receiving the request message and transmitting the generated response message, wherein the context information comprises identification information of the accessible home cell/private network cell, information on a public/macro cell locally overlapping with the accessible home cell/private network cell, at least one measurement execution period on the accessible home cell/private network cell, at least one channel condition threshold for determining the measurement execution period, and network node information controlling the accessible home cell/private network cell.

7. A method of measurement on a home cell/private network cell, by a UE, in a mobile communication system, the method comprising the steps of:
transmitting a request message requesting the measurement to a network node, the request message comprising an indicator instructing at least one of register, join, and use of the home cell/private network cell;
receiving a control message instructing measurement on at least one home cell/private network cell accessible by the UE from the network node that has received context information for measurement control of the accessible home cell/private network cell from a higher node; and
executing measurement on the accessible home cell/private network cell in accordance with the control message,
wherein the context information comprises identification information of the accessible home cell/private network cell, information on a public/macro cell locally overlapping with the accessible home cell/private network cell, at least one measurement execution period on the accessible home cell/private network cell, at least one channel condition threshold for determining the measurement execution period, and network node information controlling the accessible home cell/private network cell.

8. The method as claimed in claim 7, wherein the control message comprises at least one of information items, which comprise information on the accessible home cell/private network cell or at least one home cell/private network cell on which measurement is expected to be changed or stopped, information on a measurement gap, and information on a measurement report method of the accessible home cell/private network cell.

9. The method as claimed in claim 8 further comprises, after executing the measurement, the step of transmitting a measurement report message comprising a execution result of the measurement in accordance with the measurement report method to the network node.

10. A method of measurement on a home cell/private network cell, by a network node, in a mobile communication system, the method comprising the steps of:
receiving a request message requesting the measurement from a UE, the request message comprising an indicator instructing at least one of register, join, and use of the home cell/private network cell;
obtaining context information for measurement control of at least one home cell/private network cell accessible by the UE, from a higher node; and
transmitting a control message instructing measurement on the accessible home cell/private network cell to the UE when a public/macro cell is a serving cell of the UE or neighboring cells of the serving cell based on information of the public/macro cell locally overlapping with the accessible home cell/private network cell, the information of the public/macro cell being included in the context information; and
receiving a measurement report message comprising a execution result of the instructed measurement from the UE, wherein the context information comprises identification information of the accessible home cell/private network cell, information on the public/macro cell, at least one measurement execution period on the accessible home cell/private network cell, at least one channel condition threshold for determining the measurement execution period, and network node information controlling the accessible home cell/private network cell.

11. The method as claimed in claim 10, wherein he control message comprises at least one of information items, which comprise information on the accessible home cell/private network cell or at least one home cell/private network cell on which measurement is expected to be changed or stopped, information on a measurement gap, and information on a measurement report method of the accessible home cell/private network cell.

12. A UE executing measurement on a home cell/private network cell comprises:
a transceiver for transmitting a request message requesting the measurement to a network node, the request message comprising an indicator instructing at least one of register, join, and use of the home cell/private network cell, and receiving a control message instructing measurement on at least one home cell/private network cell accessible by the UE from the network node that has received context information for measurement control of the accessible home cell/private network cell from a higher node; and
a controlling unit for generating a first message and executing measurement on the accessible home cell/private network cell in accordance with the control message;
wherein the context information comprises identification information of the accessible home cell/private network cell, information on a public/macro cell locally overlapping with the accessible home cell/private network cell, at least one measurement execution period on the accessible home cell/private network cell, at least one channel condition threshold for determining the measurement execution period, and network node information controlling the accessible home cell/private network cell.

13. The UE as claimed in claim 12, wherein the control message comprises at least one of information items, which comprise information on the accessible home cell/private network cell or at least one home cell/private network cell on which measurement is expected to be changed or stopped, information on a measurement gap, and information on a measurement report method of the accessible home cell/private network cell.

14. The UE as claimed in claim 13, wherein, after execution of the measurement, the controlling unit controls transmission of a measurement report message comprising a execution result of the measurement to the network node in accordance with the measurement report method.

15. A network node executing measurement on a home cell/private network cell, the network node comprising:
a controlling unit for obtaining context information for measurement control on at least one home cell/private network cell accessible by a UE from a higher node, in accordance with a request message from the UE, the request message requesting the measurement and comprising an indicator instructing at least one of register, join, and use of the home cell/private network cell; and generating a control message instructing measurement on the accessible home cell/private network cell when a public/macro cell is a serving cell of the UE or neighboring cells of the serving cell based on information of the public/macro cell locally overlapping with the accessible home cell/private network cell, the information of the public/macro cell being included in the context information; and a transceiver for receiving the request message requesting the measurement and transmitting and receiving the generated control message, wherein the context information comprises identification information of the accessible home cell/private network cell, information on the public/macro cell, at least one measurement execution period on the accessible home cell/private network cell, at least one channel condition threshold for determining the measurement execution period, and network node information controlling the accessible home cell/private network cell.

16. The network node as claimed in claim 15, wherein the control message comprises at least one of information items, which comprise information on the accessible home cell/private network cell or at least one home cell/private network cell on which measurement is expected to be changed or stopped, information on a measurement gap, and information on a measurement report method of the accessible home cell/private network cell.

* * * * *